Figure 1:
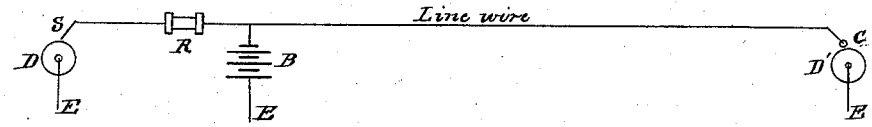

W. E. SAWYER.
Telegraphic-Circuit.

No. 166,305. Patented Aug. 3, 1875.

WITNESSES:
W. W. Hollingsworth
Solon C. Kemon

INVENTOR:
Wm. E. Sawyer
BY
ATTORNEYS.

UNITED STATES PATENT OFFICE.

WILLIAM E. SAWYER, OF WASHINGTON, DISTRICT OF COLUMBIA.

IMPROVEMENT IN TELEGRAPHIC CIRCUITS.

Specification forming part of Letters Patent No. 166,305, dated August 3, 1875; application filed June 19, 1875.

*To all whom it may concern:*

Be it known that I, WILLIAM EDWARD SAWYER, of Washington city, District of Columbia, have invented a new and useful Improvement in Telegraphic Circuits; and I do hereby declare that the following is a full, clear, and exact description of the same, reference being had to the accompanying drawing forming a part of this specification:

It is my special design to apply these improvements in circuits to my fac-simile or autographic telegraph, but it is obvious that they may be applied to most other telegraphs, such, for instance, as the Morse and the automatic; and I therefore do not limit myself to their application to any particular system.

The main principle of my present invention consists in a division of the transmitting-battery current, and the placing of that battery at the receiving end of a line.

The result of this application of electric force is not to free a line of tailings or the attenuations of impulses transmitted, which may exist to any degree in the line-wire, but to prevent those tailings or attenuations of impulses from producing any effect upon the receiving-instrument.

In order to produce or cut off action or discoloration of chemical paper in the receiving-instrument it is only necessary that the closing of the circuit at the transmitting end of a line shall set the current from the battery at the receiving end to dividing end, a part of it flowing in the direction of the transmitting end. It is not necessary, therefore, that an impulse shall ever reach the transmitting end. It is not necessary that the current shall travel any distance upon the line-wire, but that we reduce the potential of current acting upon the receiving-instrument; and to reduce this potential it is merely necessary that the current shall begin to flow by division toward the transmitting end.

In the operation of my invention I prefer an intensity to a quantity current battery. The battery which gives the best results is that which will not supply enough electricity in quantity to work two or more circuits at the same time. Intensity is desired, and a magneto-electric or an induced current gives surprising results.

In using a carbon-battery, so called, I greatly prefer that both the carbons and the zinc shall be of small size.

In the drawings, I have represented the transmitting and the receiving instruments, each by a drum and a stylus. Their places, it is obvious, may be supplied by any telegraphic mechanism for transmitting and receiving, whether for autographic, automatic, or Morse transmission.

In Figure 1 is shown the simple battery-dividing circuit. E E E are earths. C is the transmitting-stylus. D', the transmitting-drum, at, for instance, Washington. D is the receiving-drum; S, the recording-stylus; R, an adjustable resistance; and B, the transmitting-battery, at New York. Assuming the resistance of the line to be five thousand ohms, the artificial resistance R should preferably exceed five thousand ohms. It will thus be understood that when the line-wire circuit is broken, the battery B will flow entirely through the stylus S and drum D, producing action or discoloration of chemical paper; but when the line-wire circuit is closed at the transmitting end the battery-current will divide, a part flowing over the line-wire, and this division will so weaken the current flowing through the artificial line as to prevent action or discoloration at S and D. I may employ condensers or coils in connection with the artificial line, and the drum and stylus may be shunted, with adjustable rheostats to regulate the amount of current passing through the receiving-instrument, or with reversed batteries, or with both.

From the description of Fig. 1 it will be apparent that the line-wire tailings or battery-current attenuations can never affect the receiving-instrument. The resistance R is so heavy as to send all, or nearly all, the tailings to earth through the battery B, forming practically a very short circuit for the tailings, the only resistance there being the resistance of the battery. Thus it will be seen that the longer the line-wire circuit the less will the line-wire tailings affect the receiving-instrument, for the greater will be the resistance of the artificial line and proportionally the shorter will be the circuit through the battery B, through which the tailings flow. The period of time required for a line to discharge is therefore of no account, as the action upon the receiving-instrument continues only so long as the line-wire circuit is closed and the battery dividing and flaring into the line-wire, and this action ceases just so soon as the line-wire circuit is broken, as then the charge in the line-wire begins to return through the battery to earth, and the whole of the battery-current again flows through the artificial line. To make my meaning clear, the operation of my invention is comparable only to a vibration of the battery-current backward and forward, which vibration is dependent upon the closing and breaking of the line-wire circuit at the transmitting end.

Figure 2:
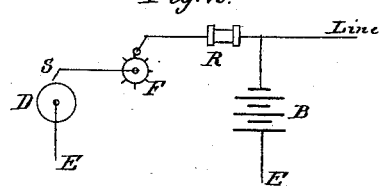

In order to secure the best results from my invention a "circuit-disturber" should be placed in the artificial line. This is shown at F in Fig. 2. By circuit-disturber I mean an arrangement very similar to any circuit-breaking device—such, for instance, as that shown in my autographic telegraph, Letters Patent No. 159,460—but with the contact-points so arranged that the circuit will never be wholly broken, but that the perfection of contact shall vary—that is to say, I place the metallic contact-points upon the drum, band, or wheel, referring to my autographic Letters Patent, so near together that the contact-point bearing upon them shall make connection with one nearly if not quite as soon as it leaves another point. The effect of this is the same as though a resistance were placed in the circuit, which resistance varies in amount, intermittently, with immense rapidity.

Figure 3:
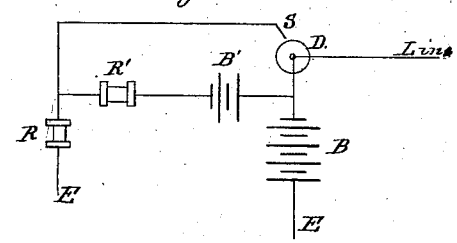

In Fig. 3 is shown another form of division of the main battery-current. R is the resistance forming the artificial line. The adjustable resistance $R^1$ and the battery $B^1$ are in a local shunt around the receiving-instrument. The battery $B^1$ effects the recording or discolors the chemical paper whenever, as before described, the main battery B is diverted in part to the line-wire. The action is so apparent that further description is unnecessary.

Figure 4:
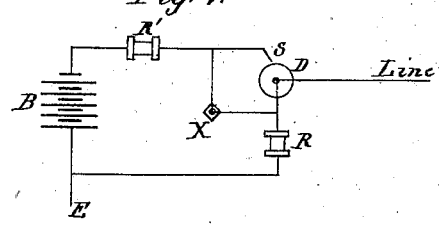

In Fig. 4 is shown another method of operation. R is the resistance, forming the artificial line. Preferably it should exceed the resistance of the line-wire. At X in the shunt may be placed an adjustable resistance, or a reversed battery, or an induction-coil, or any two or all of them. $R^1$ is a resistance exceeding the resistance of R. When the line-wire circuit is broken, so slight a portion of the battery-current passes through the stylus that no record is effected, but when the line-wire circuit is closed at the transmitting end the battery flows through the stylus and drum in sufficiently greater volume to produce the record. The line-tailing will mainly flow to earth through the resistance R, owing to the greater resistance in the circuit through $R^1$ and B.

In Figs. 5, 6, 7, and 8 are indicated various employments of batteries, &c., at the transmitting end, in connection with the arrangements at the receiving end already described, and additional to the simple circuit, Fig. 1.

Figure 5:
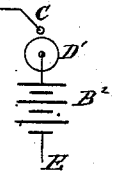

In Fig. 5, $B^2$ is a reversed battery, designed to be of sufficient power to force a perceptible neutralizing portion of its current over the battery B at the receiving end, and therefore through the artificial line, thus making more complete the cessation of action of battery B upon the receiving-instrument when the main-line circuit is established.

Figure 6:
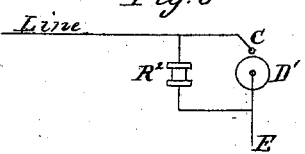

In Fig. 6 is shown a shunt around the transmitting-instrument, in which a heavy resistance, $R^2$, is placed. The object of this is to keep the line-wire statically charged by furnishing a constant long circuit for the division of battery B at the receiving end. When the contact between C and D' is made, a shorter circuit being established, the battery B flows into the line-wire in increased volume, thus accomplishing the necessary division of current to actuate the receiving-instrument or effect the recording.

Figure 7:
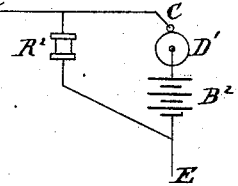

In Fig. 7 the resistance and battery are shown combined.

Figure 8:
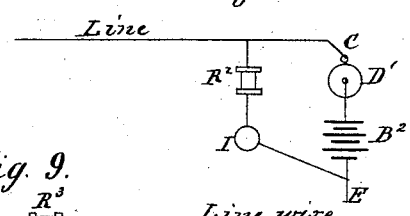

In Fig. 8 are shown the battery and resistance in combination with a primary induction-coil.

Figure 9:
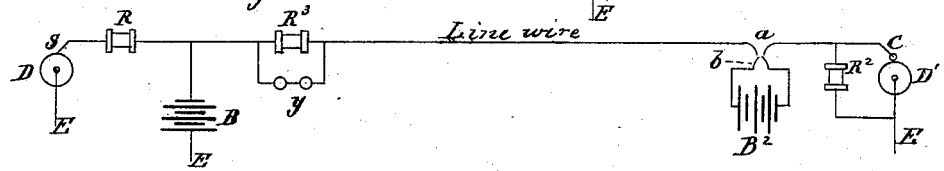

The application of this invention to autographic or fac-simile telegraphs is clearly apparent. By its use, as shown in Fig. 9, I am enabled to duplex the line-wire, using one circuit for the chemical discoloration and the other for the regulation of the apparatus, by means of which the transmitting and receiving instruments are kept in synchronous motion. $y$, at the receiving end, is an electro-magnet in a shunt, $R^3$ being the adjustable resistance by which the quantity of line-current passing through the magnet is regulated. At the transmitting end of the line-wire, $a$ is a spring-connection; $b$, the two insulated poles of the Morse battery $B^2$. The operation is obvious, the throwing of battery $B^2$ into the line-wire being caused by inserting between the two springs $a$ the electrically-separated ends of the battery $b$. This arrangement may be attached to any ordinary telegraph-key. The circuit at the transmitting end is the same as in Fig. 6. The current proceeding from battery B, whether over the long circuit of line-wire and resistance $R^2$ to earth, or over the short circuit of line-wire C and D to earth, is not of sufficient strength to operate the instrument Y; but battery $B^2$ is of sufficient strength, whether flowing through the long or short circuit, to affect Y. On the other hand, battery $B^2$ will produce no effect upon the receiving-apparatus S and D, because it will flow through the shorter circuit of battery B to earth.

I do not limit myself to the application of this duplex circuit to any particular kind of telegraph. All of the resistances shown and described herein should be adjustable, and preferably should be liquid resistances.

I claim as my invention—

1. The method of operating a line of telegraph, consisting in placing the transmitting-battery at or near the receiving end of the line-wire, and effecting the record or actuating the receiving-instrument by making and breaking the line-wire circuits at the transmitting end, whereby the battery-current passing through the receiving-instrument is alternately, equally, or unequally divided and restored to its normal strength or required maximum value, as set forth.

2. The method of operating a line of telegraph, consisting of the employment of two circuits, the line-wire circuit and an artificial line-circuit, in the latter of which is placed the receiving-instrument, which is actuated, or in which the record is effected, by causing an increment and decrement, through breaking and making the line-wire circuit of the quantity or force of the battery-current flowing in the artificial line-circuits, as set forth.

3. The artificial circuit at the receiving end of a line of telegraph, in which the battery-current flows at its required maximum of quantity or force, excepting when a greater or less portion of the battery-current is diverted into the line-wire by establishing the line-wire circuit, as set forth.

4. The method of effecting a record at the receiving-instrument, or of actuating the receiving-instrument, consisting in wholly or partially short-circuiting the main battery, which is placed at the receiving-station, by wholly or partially diverting its current from an artificial circuit into the line-wire circuit.

W. E. SAWYER.

Witnesses:
  SOLON C. KEMON,
  CHAS. A. PETTIT.